United States Patent
Launay (10) Patent No.: US 9,467,861 B2
(45) Date of Patent: Oct. 11, 2016

(54) DEVICE FOR PROTECTING AGAINST NON-AUTHORIZED USE OF AN ELECTRONIC SYSTEM INCLUDING AN ANTENNA

(71) Applicant: OBERTHUR TECHNOLOGIES, Colombes (FR)

(72) Inventor: Francois Launay, Columbes (FR)

(73) Assignee: OBERTHUR TECHNOLOGIES, Colombes (FR)

( * ) Notice: Subject to any disclaimer, the term of this patent is extended or adjusted under 35 U.S.C. 154(b) by 0 days.

(21) Appl. No.: 14/564,853

(22) Filed: Dec. 9, 2014

(65) Prior Publication Data

US 2015/0163677 A1    Jun. 11, 2015

(30) Foreign Application Priority Data

Dec. 9, 2013   (FR) ...................................... 13 62307

(51) Int. Cl.
*H04W 12/02* (2009.01)
*H04W 12/08* (2009.01)
*G06K 19/073* (2006.01)

(52) U.S. Cl.
CPC .......... *H04W 12/08* (2013.01); *G06K 19/0739* (2013.01); *G06K 19/07345* (2013.01)

(58) Field of Classification Search
CPC ................. H04W 12/08; G06K 19/07309
USPC ................. 455/66.1, 67.11, 558, 559, 575.5, 455/575.1, 575.7
See application file for complete search history.

(56) References Cited

U.S. PATENT DOCUMENTS

| | | | |
|---|---|---|---|
| 6,343,744 B1* | 2/2002 | Shibata | G06K 19/005 235/380 |
| 8,665,061 B2* | 3/2014 | Kagan | G01D 4/002 340/5.52 |
| 2007/0028192 A1* | 2/2007 | Williams | G05B 23/027 715/859 |

FOREIGN PATENT DOCUMENTS

| | | |
|---|---|---|
| DE | 10 2005 061249 | 6/2007 |
| EP | 1 030 266 | 8/2000 |
| JP | 2008 071120 | 3/2008 |

OTHER PUBLICATIONS

Jan. Search Report dated Aug. 29, 2014 from French Patent Application No. 1362307, pp. 1-2.

* cited by examiner

*Primary Examiner* — John J Lee
(74) *Attorney, Agent, or Firm* — MH2 Technology Law Group, LLP (57) ABSTRACT

A device for providing protection against non-authorized use of an electronic system including an antenna, the device comprising a first switch suitable for inhibiting the operation of the electronic system, the first switch being arranged as a short-circuit between at least two turns of the antenna. Additional implementations include an electronic system including such a protection device.

16 Claims, 7 Drawing Sheets

DEVICE FOR PROTECTING AGAINST NON-AUTHORIZED USE OF AN ELECTRONIC SYSTEM INCLUDING AN ANTENNA

CROSS-REFERENCE TO RELATED APPLICATIONS

This application claims priority to French Application No. 1362307, filed on Dec. 9, 2013, the entire disclosure of which is hereby incorporated by reference in its entirety.

The present invention relates to a device for protecting against non-authorized use of an electronic system of the type including an antenna.

Electronic systems of the type including an antenna are in widespread use nowadays. The antenna enables such an electronic system to converse with a corresponding reader/transmitter, which also includes an associated antenna. Such an interface by means of antennas is advantageous in that it makes it possible to establish a link between an electronic system and a reader/transmitter that is suitable for exchanging data and for doing so without making contact. Thus, such an electronic system advantageously no longer needs to be put into contact with the reader/transmitter in an accurately determined position and/or orientation. A connection may advantageously be established, remotely and even just by passing, so long as the electronic system remains within range of the reader/transmitter.

Such an electronic system may be a radio frequency identification (RFID) transponder, a toll paying device, a medium fitted with a near field communication (NFC) interface, or a micro-circuit card of the contactless type.

Such a microcircuit card includes an antenna in order to receive its electrical power supply by induction and in order to communicate with an appropriate reader/transmitter. Such microcircuit cards are in ever greater use nowadays as identity documents, social security cards, medical dossiers, telephone cards, bankcards, or commercial loyalty cards. In this respect, such a card contains data that is confidential and that needs to be protected.

The specific way in which such a contactless connection is established suffers from the drawbacks of its own advantages. Contactless communication leaves the way open to piracy, also known as "electronic pickpocketing". When performing such piracy, a pirate reader that reproduces at least certain characteristics of an authorized reader/transmitter accosts an electronic system and converses with it in order to obtain information that ought to remain confidential.

This is made possible by having a range that enables an approach to be made discreetly, from some distance away, while the electronic system is left unattended, and also in situations where the electronic system appears to be protected. Examples of such situations are as follows: the electronic system is carried by its user, being visible as a badge, or not visible while in a pocket or a wallet; the electronic system is stored out-of-sight in a piece of furniture, a drawer, or a briefcase, which might possibly be locked; the electronic system is in a motor vehicle, inaccessible but visible behind a windscreen; in a showcase; etc.

If a pirate reader can be brought up into the range of electronic system, potential piracy is to be feared. It is thus appropriate to make available a protection device that enables a user to agree to setting up a connection and/or prior to making any transaction.

In order to inhibit the operation of an electronic system including an antenna, it is known to cut through a turn of the antenna in selective manner. Thus, a switch arranged in series in a turn of the antenna can be used selectively, when closed, to have an antenna that is continuous and operational, thus making the system operational, and when it is open, to have an antenna that is open, thereby inhibiting the system.

Nevertheless, depending on the technology used for making that switch, it may be possible to select only one control logic between inhibited by default or authorized/operational by default. It is thus desirable to propose alternative means for inhibiting the electronic system, which said alternative means being capable of providing the other control logic.

It is also known to provide an electronic system with a switch, e.g. a mechanical switch, or a switch that is at least sensitive to pressure exerted by pressing, e.g. with a finger. Such finger pressure, typically applied by the proprietor of the electronic system, thus authorizes the system to operate. Such a switch presents the following drawbacks. If the switch is bistable, a first press makes the system operational, and a second press is needed to inhibit it once again after use, i.e. after a transaction has been completed, thereby making it safe. There is a major risk of forgetting to apply the second press. In contrast, if the switch is monostable, it is necessary to continue pressing in order to make the system operational. Such pressure must be maintained throughout the entire duration of the transaction, which can turn out to be awkward.

In order to guard against piracy while the electronic system is stored away and hidden, it is also known to provide an electronic system with a switch that is photosensitive. Exposure to light is needed in order to authorize operation of the system and make it operational. Thus, such an electronic system is protected against piracy in configurations in which it is hidden in a pocket; a wallet; an opaque drawer; etc. Such a characteristic presents the drawback of not protecting an electronic system whilst it is illuminated: while being worn visibly as a badge, while lying on a dashboard or a rear shelf of a motor vehicle, etc.

The present invention remedies those various drawbacks.

The invention provides a device for providing protection against non-authorized use of an electronic system including an antenna, the device comprising a first switch suitable for inhibiting the operation of the electronic system, the first switch being arranged as a short-circuit between at least two turns of the antenna.

According to another aspect, the first switch is normally closed and includes drive means enabling it to be opened.

According to another aspect, the first switch is photosensitive and is open when it is illuminated.

According to an alternative aspect, the first switch is photosensitive and is open when it is not illuminated.

According to another aspect, the photosensitive element of the first switch is of a size that is small enough to enable it to be covered by masking means having substantially the size of a finger.

According to another aspect, the device further includes a second switch suitable for inhibiting the operation of the electronic system.

According to another aspect, the second switch is photosensitive and is suitable for inhibiting the operation of the electronic system when the second switch is not illuminated.

According to an alternative aspect, the second switch is photosensitive and is suitable for inhibiting the operation of the electronic system when the second switch is illuminated.

According to another aspect, the photosensitive element of the second switch is of a size that is small enough to enable it to be covered by masking means having substantially the size of a finger.

According to another aspect, the second switch operates with logic that, relative to lighting, is the inverse of the logic of the first switch.

According to another aspect, the second switch is arranged as a short-circuit between at least two turns of the antenna.

According to another aspect, the second switch is arranged in series in a turn of the antenna.

According to another aspect, the sensitive element of the first switch and/or the sensitive element of the second switch comprises an organic photoconductive material.

According to another aspect, the sensitive element of the first switch and/or the sensitive element of the second switch is covered in translucent window.

The invention also provides an electronic system including an antenna having such a protection device.

According to another aspect, the electronic system is a microcircuit card.

Advantageously, the microcircuit card is defined in compliance with the ISO 7816 standard.

The invention also provides a method for manufacturing that comprises the following steps: making a support including an antenna, depositing an organic photoconductive material in contact with the antenna, and covering with at least one protection layer including a translucent window at least in register with (e.g. facing) the organic photoconductive material.

The invention also provides a reader/transmitter of the type suitable for communicating with such an electronic system, including at least one illumination means and/or at least one masking means suitable for co-operating with the protection device.

Other aspect, details, and advantages of the invention appear more clearly from the following detailed description given by way of indication and with reference to the drawings, in which.

A protection device of the invention may be implemented in any electronic system 1 including an antenna 4. Such an electronic system 1 may be an RFID transponder, a toll paying device, a medium fitted with an NFC interface, or a microcircuit card of the contactless type.

Figure 1:
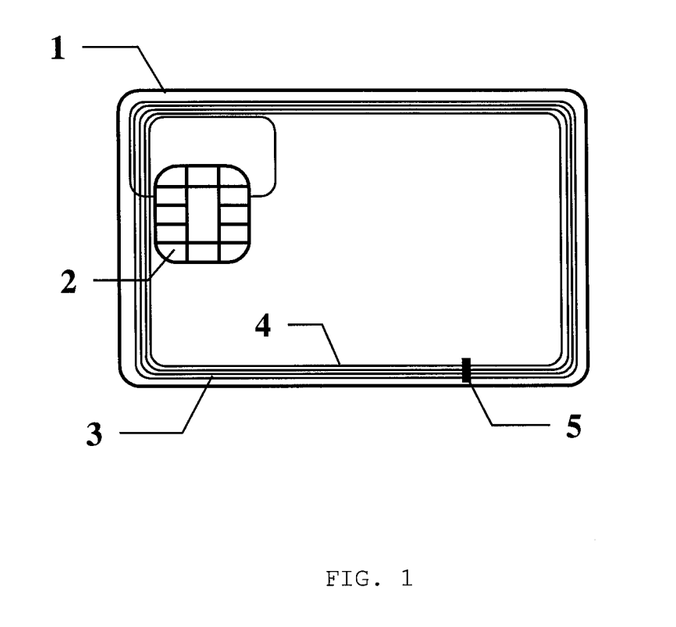
FIG. 1 shows an electronic system provided with a "short-circuit" switch.

FIG. 1 shows a microcircuit card 1, by way of illustration. Such a card includes a module 2 having a microcircuit. The microcircuit is interfaced with an antenna 3, typically made up of a winding of turns 4. Such a microcircuit card 1 may be a so-called "contactless" card suitable for establishing a connection solely via its antenna 3, or it may be a so-called "dual" card suitable for establishing a connection either via its antenna 3, or via a contact interface. The antenna 3 is used to converse with the outside and to establish a connection enabling data to be exchanged between data stored in a memory of the microcircuit and a reader/transmitter suitable for establishing a connection with the electronic system 1. A session comprising setting up a connection, implementing one or more exchanges of data, and terminating the connection is referred to as a "transaction".

Providing protection against piracy, as explained above, requires the ability to prevent a transaction taking place in the absence of authorization from the proprietor of the electronic system 1. For that purpose, it is appropriate to be able to have means enabling the operation of the electronic system 1 to be inhibited.

According to a first aspect of the invention, shown in FIG. 1, such inhibit means may advantageously be implemented by means of a switch acting selectively on the antenna 3 so as to set up a short-circuit between at least two turns 4 of the antenna 3. Thus, when the switch 5 is closed and such a short-circuit is established, the effective length of the antenna 3 is modified, thereby modifying its impedance, and doing so sufficiently to ensure that the antenna 3 is no longer tuned. It is then no longer possible to set up a connection via said antenna 3. The electronic system 1 is then incapable of conversing with the outside, and is therefore inhibited and incapable of carrying out a transaction. In contrast, when the switch 5 is open, no short-circuit is established, and the antenna 3 is back in its nominal state in which it is suitable for performing its functions and enabling a connection to be set up.

With an electronic system 1 that does not have its own on-board electrical power supply, such as an RFID transponder or a micro circuit card, electrical power is delivered by the reader by means of magnetic induction. The antenna 3 then serves initially as an electrical power supply receiver in order to wake up the micro circuit and subsequently be able to set up a connection. If the antenna 3 is out of tune, then this initial function of the antenna 3 cannot be performed and the microcircuit is not woken up. The electronic system 1 is then expressly and doubly inhibited.

FIGS. 2 to 5, 7 to 8, and 14 to 17 are equivalent electrical circuit diagrams corresponding to various different embodiments. They show the logic and the function of the switches. They make no assumptions about the means and the technologies used to provide the switches.

As shown in FIGS. 2 to 5, a switch 5 is arranged selectively to establish a short-circuit between sit least two turns 4 of the antenna 3. Such a switch 5 is referred to herein as a "short-circuit" or "shunt" switch. For this purpose it typically comprises contact means that selectively conduct electricity. Such a switch 5 may have two configurations: in an open configuration, the contact means are inoperative and the turns 4 are all insulated from one another; whereas in a closed configuration, the contact means are operative and put at least two turns 4 electrically into contact with each other, thereby creating a short-circuit. The contact means may connect together two or more turns up to the total number of turns 4 to be found in a section of the antenna 3. Such a switch 5 may be located at any point on the antenna 3. Advantageously, in order to take the antenna as far as possible out of tuning, it is placed so that the short-circuited antenna 3 as seen by the microcircuit is as short as possible.

Such a "short-circuit" switch 5 may be controlled to go from the open configuration to the closed configuration by various drive means: automatic return means 7, manual drive 8, or light 9.

Figure 2:
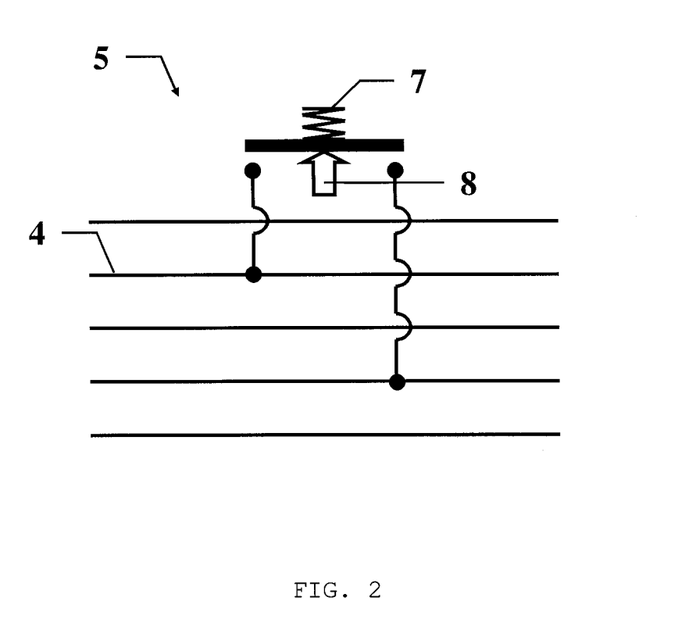
FIG. 2 is an equivalent electrical circuit diagram of a manually-operated "short-circuit" switch.

In the embodiment of FIG. 2, the switch 5 is normally closed, as represented by return means 7 urging it towards its closed position. It should be observed that the return means 7 are representative of operation, but that no resilient return means need necessarily be present. The switch 5 includes manual drive 8 enabling it, on being operated, to pass into an open configuration. Such manual drive 8 covers any mechanical or pressure-sensitive principle suitable for detecting a change of state between a press and no press, and vice versa.

Thus, a "short-circuit" switch 5 of FIG. 2 enables an electronic system 1 to be protected against potential piracy. When the electronic system 1 is left alone, the switch 5 is closed, so the antenna 3 is untuned, and the electronic system 1 is inhibited in that it cannot communicate with a reader, e.g. a pirate reader. When the proprietor of the electronic system desires to use it, it is appropriate for the proprietor to authorize this use during the transaction. To do that, the proprietor must move the drive means 8 in order to open the switch 5. The antenna 3 then returns to its nominal, i.e. tuned, state, and the electronic system 1 can operate in order to carry out a transaction.

Figure 3:
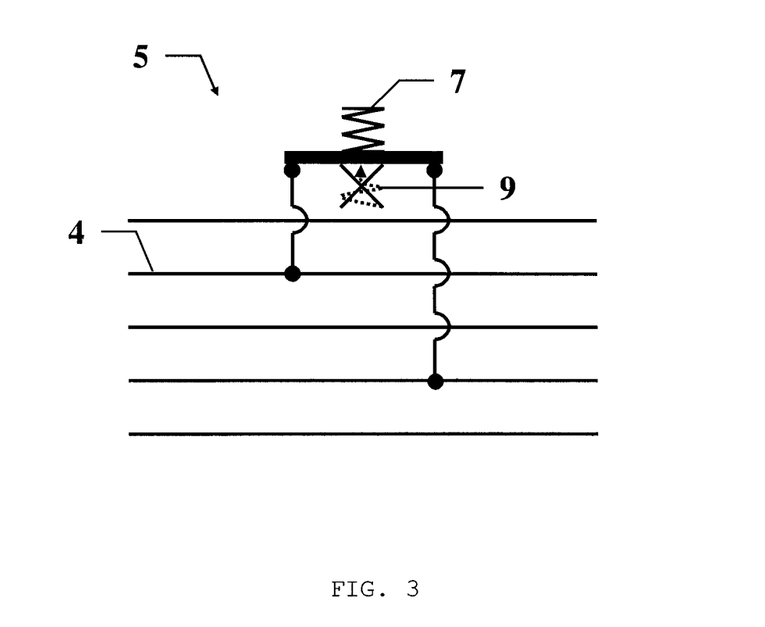
FIGS. 3 and 4 are equivalent electrical circuit diagrams of a photosensitive "short-circuit" switch in a first embodiment.
Figure 4:
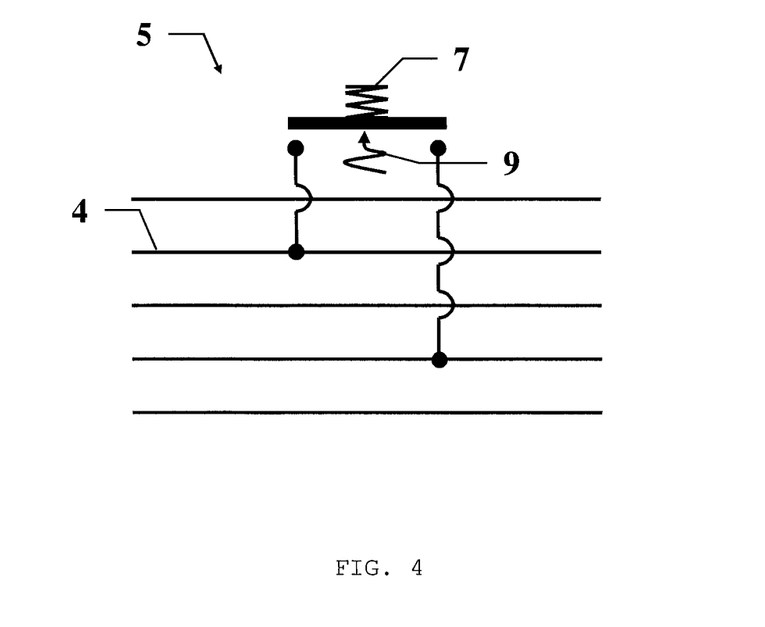

A "short-circuit" switch 5 may also be photosensitive in that it is controlled and can change configuration between open and closed as a function of whether or not it is exposed to light 9. In another embodiment, shown in FIGS. 3 and 4, a switch 5 is open while it is illuminated, and on the contrary it is closed while it is not illuminated. In this example, as shown in FIG. 3, the switch is closed by default when it is not illuminated, as represented by the return means 7 and the absence of light 9. Thus, when the electronic system 1 is in the dark, or when the switch 5 is masked and does not receive light 9, the antenna 3 is untuned and the electronic system 1 is inhibited and thus protected against piracy. This protects the electronic system 1 in the event of being used while it is not visible. In order to authorize use of the system, the proprietor must perform a voluntary action, which in this example consists in exposing at least the switch 5 to light 9, such as daylight, ambient lighting, or deliberate lighting, e.g. by means of a flashlight, so as to cause the switch 5 to pass into its open configuration, as shown in FIG. 4.

In this operating logic, the light 9 authorizes operation of the electronic system 1, thereby protecting an electronic system 1 against piracy so long as it remains in the dark.

Figure 5:
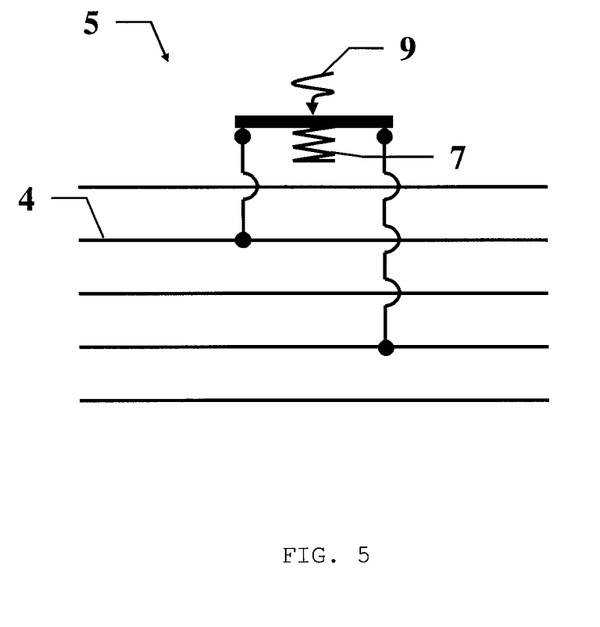
FIG. 5 is an equivalent electrical circuit diagram of a photosensitive "short-circuit" switch in a second embodiment.

In another embodiment, a photosensitive "short-circuit" switch 5 may also be used with inverse logic. As shown in FIG. 5, the switch 5 is open by default when it is not illuminated, as represented by the return means 7. Thus, when the electronic system 1 is fully lighted and the switch 5 receives light 9, the antenna 3 is untuned and the electronic system 1 is inhibited and thus protected against piracy. This protects the electronic system 1 in the event of being used while it is visible: in a badge carrier, in a showcase, in a motor vehicle, behind a window, etc. In order to be able to authorize use of the system, the proprietor must perform a voluntary action so that the switch 5 is no longer exposed to lighting. This may be done by switching off the lighting 9 or by masking the switch 5 so that light cannot reach it. Thus, the switch 5 changes to an open configuration, and allows the electronic system 1 to operate.

In this operating logic, the light 9 prevents operation of the electronic system 1, thereby protecting an electronic system 1 against piracy so long as it is subjected to a lighting.

Figure 6:
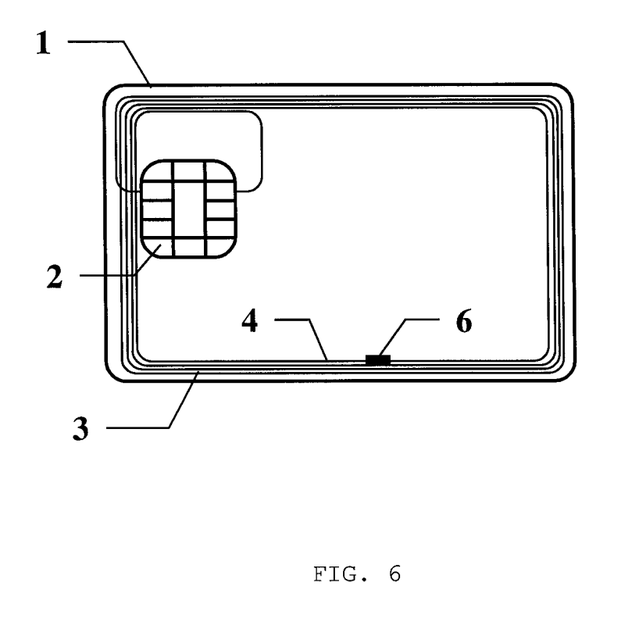
FIG. 6 shows an electronic system provided with a "series" switch.

In another embodiment of the invention, as shown in FIG. 6, other means for implementing inhibition comprise a switch 6 acting selectively on the antenna 3 so as to make an opening or a closure within a turn 4 of the antenna 3. Such a switch 6 is arranged in series in a turn 4 taking the place of a portion of the turn 4. Thus, when the switch 6 is open, the antenna circuit 3 is open. It is then no longer possible to set up a connection via said antenna 3. The electronic system 1 is then incapable of conversing with the outside, and is therefore inhibited. On the contrary, when the switch is closed, the antenna 3 returns to its nominal, looped, state and is suitable for performing it's functions and for enabling a connection to be set up.

Figure 7:
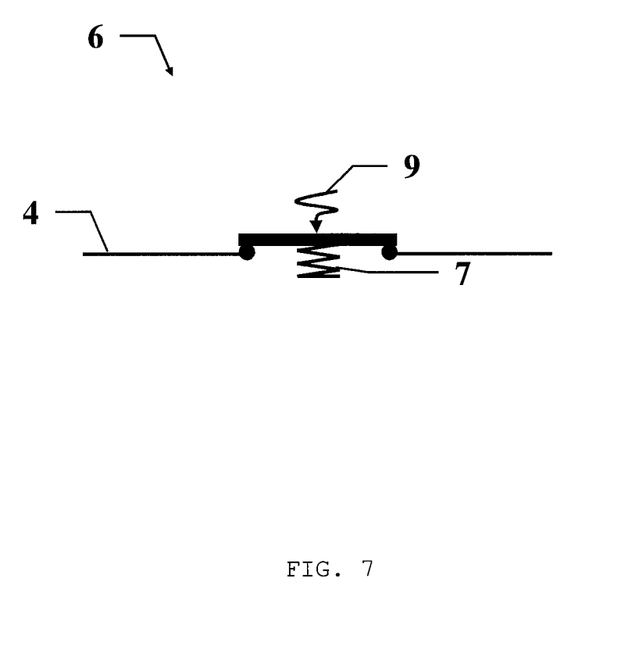
FIG. 7 is an equivalent electrical circuit diagram of a photosensitive "series" switch in a first embodiment.
Figure 8:
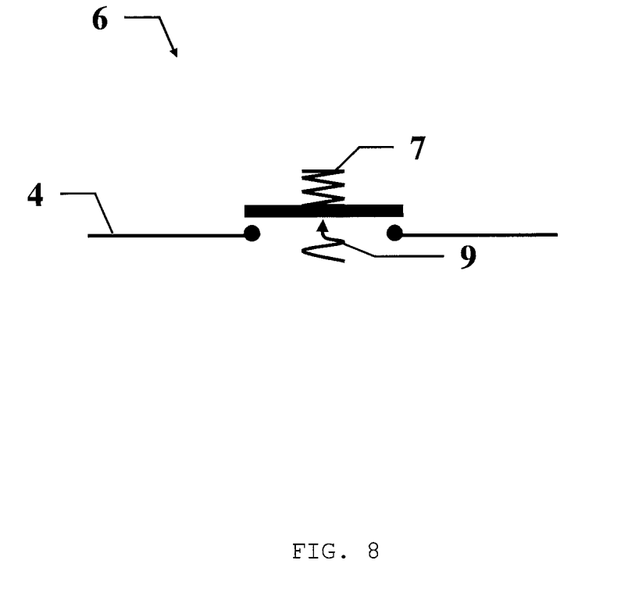
FIG. 8 is an equivalent electrical circuit diagram of a photosensitive "series" switch in a second embodiment.

As shown in FIGS. 7 and 8, a switch 6 is arranged selectively to establish an opening or a closure in a turn 4 of the antenna 3. Such a switch 6 is referred to herein as a "series" switch. For this purpose it typically comprises contact means that selectively conduct electricity. Such a switch 6 may have two configurations: in an open configuration, the contact means are inoperative and the turn 4 is open; while in a closed configuration, the contact means are operative and they close the turn 4 electrically. Such a "series" switch 6 may be located at any point on the antenna 3.

Such a "series" switch 6 may be controlled to go from the open configuration to the closed configuration by various drive means: automatic return means 7, manual drive 8, or light 9.

In an embodiment that is not shown, corresponding to a known embodiment, the switch 6 is normally open, with return means 7 urging it towards its open position. The switch 5 includes manual drive 8 enabling it, on being operated, to pass into a closed configuration.

Thus, a "series" switch 6 enables an electronic system 1 to be protected against potential piracy. When the electronic system 1 is left alone, the switch 6 is open, the antenna 3 is then inoperative, and the electronic system 1 is thus inhibited. When the proprietor of the electronic system desires to use it, it is appropriate for the proprietor to authorize this use during the transaction. To do that, the proprietor must move the drive means 8 in order to close the switch 6. The antenna 3 then returns to its nominal, i.e. tuned, state, and the electronic system 1 can operate in order to carry out a transaction.

A "series" switch 6 may also be photosensitive in that it is controlled and can change configuration between open and closed as a function of whether or not it is exposed to light 9. In an embodiment, shown in FIG. 7, a switch 6 is closed while it is illuminated, and on the contrary it is open while it is not illuminated. In this example, as shown in FIG. 7, the switch is open by default when it is not illuminated. Thus, when the electronic system 1 is in the dark, or when the switch 6 is masked and does not receive light 9, the antenna 3 is interrupted and the electronic system 1 is inhibited and thus protected against piracy. This protects the electronic system 1 in the event of being used while it is not visible. In order to be able to authorize use of the system, the proprietor must perform a voluntary action in order to expose the switch 6 to light 9, such as daylight, ambient lighting, or deliberate lighting, e.g. by means of a flashlight, so as to cause the switch 6 to pass into its closed configuration.

With this operating logic, the light 9 authorizes operation of the electronic system 1, thereby protecting an electronic system 1 against piracy so long as it remains in the dark.

In another embodiment, a photosensitive "series" switch 6 may also be used with inverse logic. As shown in FIG. 8, the switch 6 is closed by default when it is not illuminated. Thus, when the electronic system 1 is fully lighted and the switch 6 receives light 9, the antenna 3 is interrupted and the electronic system 1 is inhibited and thus protected against piracy. This protects the electronic system 1 in the event of being used while it is visible: in a badge carrier, in a showcase, in a motor vehicle, behind a window, etc. In order to be able to authorize use of the system, the proprietor must perform a voluntary action so that the switch 6 is no longer exposed to lighting. This may be done by switching off the lighting or by masking the switch 6 so that light cannot reach it. Thus, the switch 6 changes to a closed configuration, loops the antenna 3, and allows the electronic system 1 to operate.

With this operating logic, the light 9 prevents operation of the electronic system 1, thereby protecting an electronic system 1 against piracy so long as it is subjected to lighting.

In order to enable a photosensitive switch to operate, it is necessary for light rays 9 to be capable of reaching said switch 5, 6, and more particularly of reaching its photosensitive element. Also, in register with the switch, the electronic system 1 must be uncovered. Between the photosensitive element and the outside there must exist a path that is free of matter or that contains only translucent materials.

In the embodiments of FIGS. 1, 6, 9, and 11, the antenna 3 and the switch(es) 5, 6, 10, 11 are arranged on a peripheral layer of the microcircuit card 1, or only under one or more translucent layers.

Figure 10:
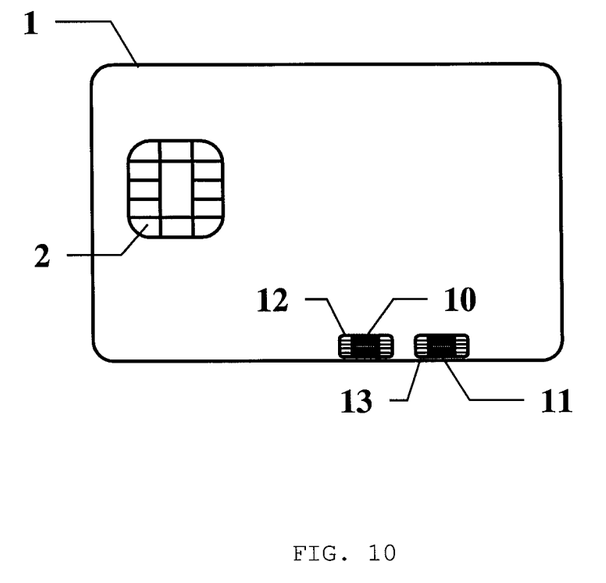
FIG. 10 shows an electronic system provided with translucent windows.

In an alternative embodiment, shown in FIG. 10, the antenna 3 is covered for the most part by at least one opaque layer. Nevertheless, in register with each of the photosensitive elements of the switches 10, 11, this opaque layer includes a cutout that is empty or that contains a translucent material so as to form a window 12, 13 allowing light to pass.

Figure 11:
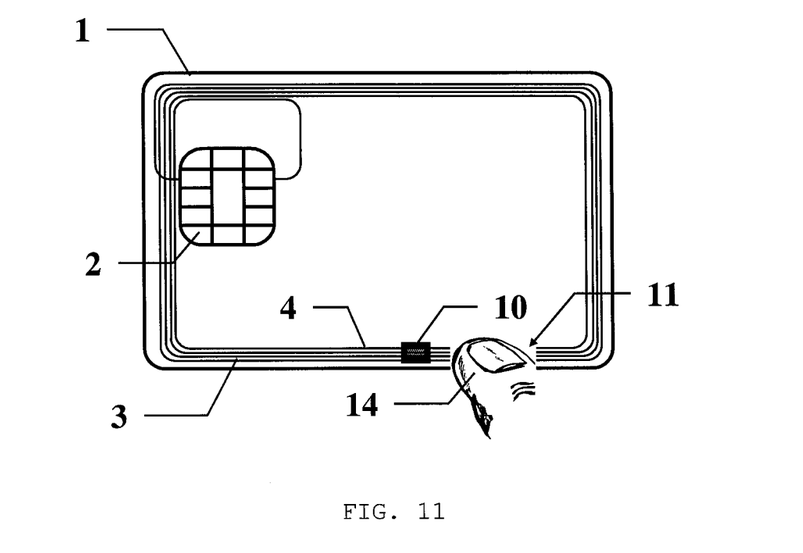
FIG. 11 shows an electronic system provided with two switches of inverse logic and showing how it is used.

As described above with reference to the embodiment of FIG. 5, or as shown in FIG. 11, a switch 5, 6, 10, 11 may be put into one configuration by eliminating its exposure to light, by masking. Any masking tool or means may be used for this purpose. If the photosensitive element of a switch 5, 6, 10, or 11 is of a size that is small enough to enable it to be covered by masking means having substantially the size of a finger 14, then it is possible to use a finger 14. A finger 14 is advantageous in that one is always available, without requiring any specific additional tool.

Such masking means or a finger 14 prevent the photosensitive element of a switch being illuminated and thus make it possible to obtain the non-illuminated configuration of the switch, even in full light.

Such a switch 5, 6, 10 or 11 is thus controlled merely by putting said masking means or finger 14 in front of the sensitive element of the switch, or by withdrawing the masking means (or the finger).

When such a switch needs to be masked, in order to make it possible quickly and simply to find the position where to place the masking means and/or finger 14, the position of the switch and more particularly of its sensitive element is advantageously marked. This marking is advantageously arranged on the outside surface of the electronic system 1. It may consist in visible sign, such as a marking, or tactile marking by modifying the shape or the texture of the surface. Such means make it possible to indicate where the operation needs to be performed, for a switch that is pressure-sensitive, or the location of masking means, for a switch that is photosensitive.

Figure 9:
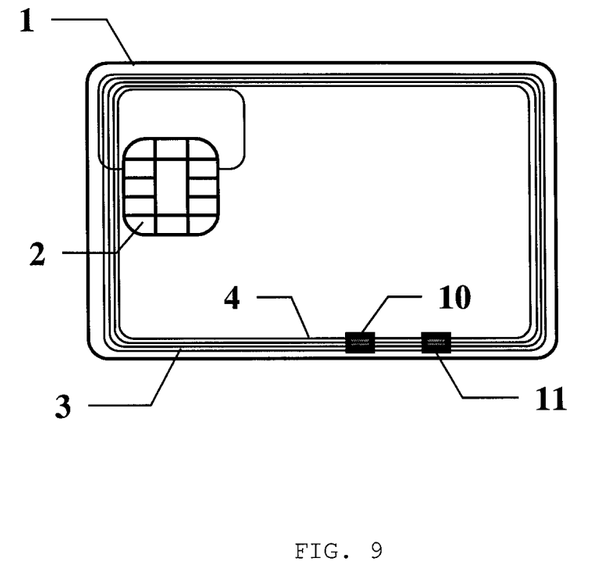
FIG. 9 shows an electronic system provided with two switches.

The description above relates to various switch embodiments suitable for protecting an electronic system 1 against various piracy scenarios that are sometimes contradictory, such as for example providing protection in the light and providing protection in the dark. In order to combine these various protections, in order to provide redundancy in security, or in order to improve protection by a double effect, it is advantageous to protect an electronic system 1 by means of at least two switches 10, 11, as shown in FIG. 9.

To implement each of these two switches 10, 11, it is possible to use any of the above-described embodiments and all combinations of those embodiments are possible. Thus, both of the switches 10, 11 may be of the "series" type or both of them may be of the "short-circuit" type, or there may be one of each type. Independently, each of the two switches 10, 11 may include manual control 8 or it may be photosensitive and be controlled by light 9. Also independently, each of the two switches 10, 11 may be inhibited when illuminated or when not illuminated.

Thus, the two switches 10 and 11 may be identical in order to provide redundancy in terms of security. Thus, by way of example, both of the two switches 10, 11 may be of the "short-circuit" type, being manually controlled or photosensitive, and they may be inhibit switches when not illuminated or when not operated. Such an arrangement thus creates two redundant inhibit means and therefore requires two simultaneous and voluntary actions on the part of the proprietor, one on each of the two switches 10, 11 in order to authorize a transaction.

Nevertheless, an embodiment with two switches 10, 11 becomes particularly advantageous when both switches operate with logics that are inverse relative to light 9.

Logic is said herein to be "inverse" when the switches behave in opposite manners for authorizing/inhibiting the operation of the electronic system 1 in response to being illuminated 9. Thus, if the first switch 10 inhibits the operation of the electronic system 1 while the first switch 10 is illuminated, then the second switch 11 presents inverse logic if the second switch 11 inhibits operation of the electronic system when the second switch 11 is not illuminated. Conversely, if the first switch 10 inhibits the operation of the electronic system 1 while the first switch 10 is not illuminated, then the second switch 11 presents inverse logic if the second switch 11 inhibits operation of the electronic system when the second switch 1 is illuminated.

Such complementary logic advantageously makes it possible to combine the kinds of protection provided by each of the two switches 10 and 11. Thus, when the electronic system 1 is not visible and/or in the dark, that one of the two switches 10 and 11 that inhibits when it is not illuminated prevents piracy. In contrast, when the electronic system 1 is exposed to light 9, then the other switch 11 or 10, i.e. the switch that inhibits when it is illuminated, prevents piracy. Thus, the electronic system is protected under all lighting configurations. The electronic system 1 can be left in complete safety both when hidden in a pocket or a glovebox, and when visible in a badge carrier or behind a windshield. When the proprietor seeks to carry out a transaction, it is necessary firstly to place the electronic system 1 in the light 9 in order to illuminate the switch 10, 11 that inhibits while it is not illuminated, and that therefore authorizes when it is illuminated, and to mask the other switch 11, 10, e.g. with a finger 14, so that it authorizes a transaction since the masking ensures that it is not illuminated.

Various embodiments are possible for obtaining two switches 10 and 11 that present inverse logic. In a measuring system between a sensitive element of a switch and the result, i.e. to authorize or inhibit, it is possible to invert the logic at several levels in the measuring/processing system.

A first level of inversion appears in the sensitive element. Depending on the technology used, the element may be conductive or nonconductive as a function of the control press 8 or as a function of light 9.

A second level of inversion may exist between the sensitive element and the contact element for closing the contact, in that it is possible to insert inverter means. Given that it requires the addition of a component, this level of inversion should nevertheless be avoided.

A third level of inversion is also present in the type of configuration that is selected between "series" and "short-circuit". It is appropriate to observe at this point, that, other things being equal, a "series" switch presents logic that is the inverse of a "short-circuit" switch.

Diagrams 14 to 17 show possible pairs of a first switch 10 and a second switch 11 that present inverse logics. In these figures, the return means 7 are omitted in order to avoid overcrowding the figures. In all of the configurations, the first switch 10, located on the left, performs inhibition when there is no light, while the second switch 11, located on the right, inhibits on the contrary in the presence of light. In order to operate, an electronic system 1 protected by two such switches 10 and 11 must therefore be placed in the light 9 so that the first switch 10 authorizes operation, and masking means 14 must be used on the second switch 11 so that it too authorizes operation.

Figure 14:
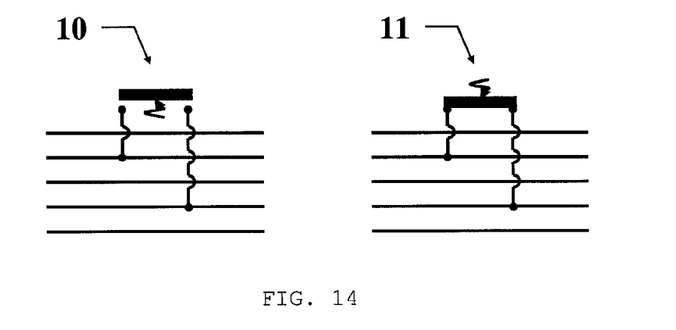
FIGS. 14 to 17 show four combinations of pairs of switches with inverse logic.

The embodiment of FIG. 14 has two "short-circuit" switches, the first switch, 10, reproduces the embodiment of FIG. 4 so as to inhibit in the dark, and the second switch reproduces the embodiment of FIG. 5 so as to inhibit in the presence of light 9. Since the two switches 10 and 11 are substantially identical, inversion is typically obtained by adding an inverter to one of the two switches.

Figure 15:
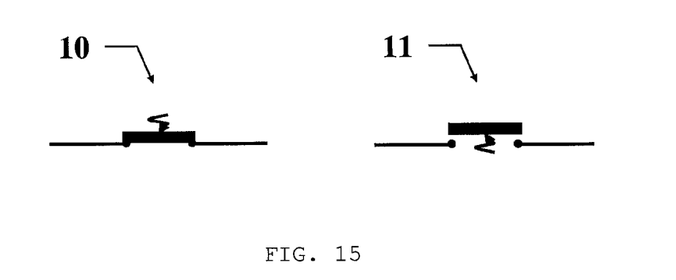

The embodiment of FIG. 15 has two "series" switches, the first switch, 10, reproduces the embodiment of FIG. 7 so as to inhibit in the dark, and the second switch reproduces the embodiment of FIG. 8 so as to inhibit in the presence of light 9. Since the two switches 10 and 11 are substantially identical, inversion is typically obtained by adding an inverter to one of the two switches.

Figure 16:
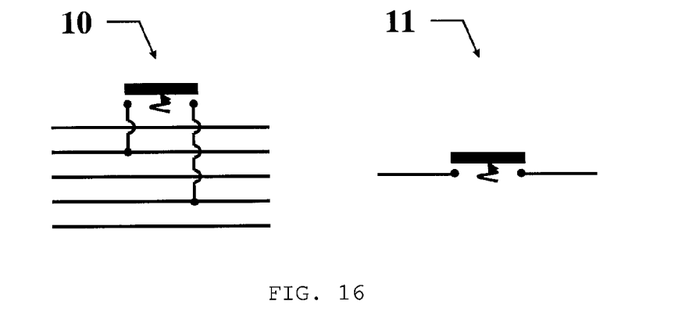

The embodiment of FIG. 16 has a "short-circuit" first switch, 10, that reproduces the embodiment of FIG. 4 so as to inhibit in the dark, and a "series" second switch, 11, that reproduces the embodiment of FIG. 8 so as to inhibit in the presence of light 9. In this example, the inversion is advantageously obtained by changing the type of switch.

Figure 17:
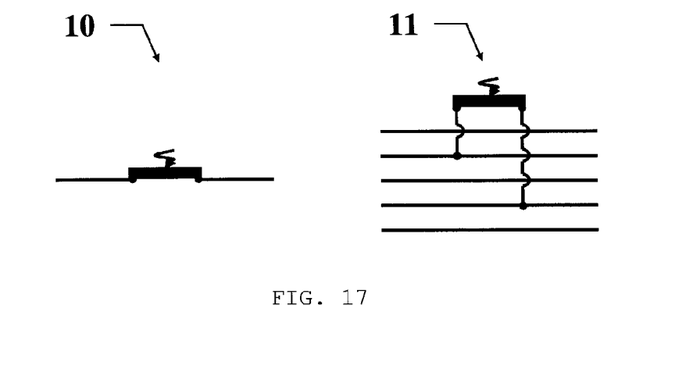

The embodiment of FIG. 17 has a "series" first switch, 10, that reproduces the embodiment of FIG. 7 so as to inhibit in the dark, and a "short-circuit" second switch, 11, that reproduces the embodiment of FIG. 5 so as to inhibit in the presence of light 9. In this example, the inversion is advantageously obtained by changing the type of switch.

The two embodiments of FIGS. 16 and 17 are advantageous in that the inversion is obtained by changing the type of switch between "Series" and "short-circuit".

The photosensitive element may be implemented by any means suitable for transforming information about the presence of light 9 into electrical information: voltage, current, continuity, etc. By way of example, mention may be made of a photodiode that conducts while it is illuminated. Such a photodiode may be used directly to make the circuits that close a circuit when they are illuminated, i.e. the embodiments of FIGS. 5 and 7.

For the other circuits, that close a circuit when they are illuminated, i.e. the embodiments of FIGS. 4 and 8, it is appropriate to use an inverter together with the photodiode.

Under such circumstances, it results that the combinations of FIG. 14 and of FIG. 15 require one inverter, and the combination of FIG. 16 requires two inverters. In contrast, the particularly advantageous combination of FIG. 17 does not require any inverter, the inversion between the first switch 10 and the second switch 11 being obtained by changing the type of switch between "series" and "short-circuit".

In an advantageous embodiment, particularly for an electronic system 1 of small size, and above all of small thickness, such as a microcircuit card, the sensitive element is advantageously made of organic photoconductive material fox the first switch 10 and/or for the second switch 11. Such, a material is also advantageous in the form of a material suitable for being deposited in a thin layer, such as a varnish, a paint, or a photoconductive ink. Such a material may be deposited by any means: printing, offset printing, inkjet printing, silkscreen printing, etc.

Figure 12:
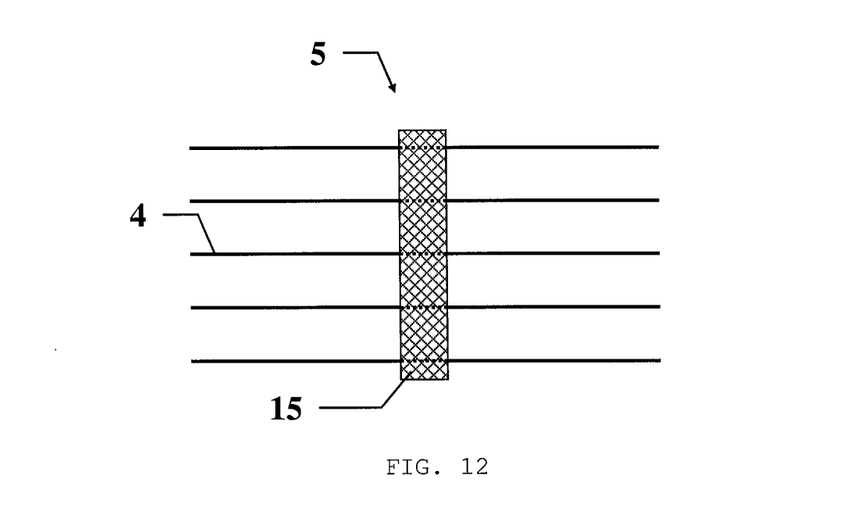
FIG. 12 shows an embodiment of a photosensitive "short-circuit" switch.
Figure 13:
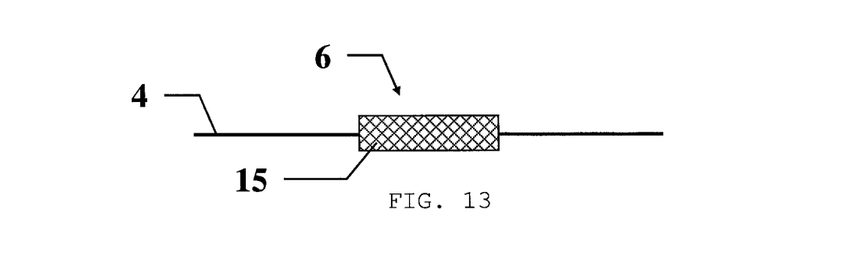
FIG. 13 shows an embodiment of a photosensitive "series" switch.

With reference to FIGS. 12 and 13 there follows a description of an embodiment that advantageously makes use of such a photoconductive organic material.

It is assumed that the material is conductive when it is illuminated, given that such a material is nowadays available. Nevertheless, it is possible in the future that the inverse property will also become available, i.e. an organic material that is conductive in the dark and that becomes insulating in the light.

FIG. 12 shows a "short-circuit" switch. A strip of photoconductive material 15 is deposited across turns 4 so as to interconnect at least two of them. The turns 4 are not modified in any other way. Such an embodiment produces a switch in compliance with the embodiment of FIG. 5. When the material 15 is illuminated it conducts and establishes a short-circuit between the turns 4, thereby taking the antenna 3 out of tune and inhibiting the electronic system 1. In contrast, in the dark, is one when masked, the material 15 does not conduct and the antenna 3 is operational.

FIG. 13 shows a "series" switch. A strip of photoconductive material 15 is deposited to replace a previously-removed segment of a turn 4. Such an embodiment produces a switch in compliance with the embodiment of FIG. 7. When the material 15 is illuminated it conducts, and closes the circuit between the two portions of turn 4, thereby making the antenna 3 operational. In contrast, in the dark, or when masked, the material 15 does not conduct and the turn 4 is open/interrupted and the electronic system 1 is thus inhibited.

A method for manufacturing a protection device in accordance with any of the above-described embodiments comprises the following steps. A support is made in conventional manner together with its antenna. The antenna is left free in that it is not covered in electrical insulation, or said insulation is removed at the interfaces with said switches, so as to enable contact to be made directly with one or the other of the switches. Depending on the embodiment, said antenna may be modified: thus, a track may be interrupted in order to put a "series" switch into place. The switches are put into place in association with the antenna. In an embodiment using an organic photoconductive material, the material is deposited between the two ends of the interruption in a track for a "series" switch, or across the tracks that are to be short-circuited for a "short-circuit" switch. Thereafter the assembly is protected by being covered in at least one protective layer. When at least one of the switches is photosensitive, the protective layer is advantageously translucent, at least in a window arranged in register with that switch.

The invention also provides a reader/transmitter of the type suitable for communicating with an electronic system 1 as described above. According to an advantageous aspect, such a reader/transmitter may include at least one lighting means associated with each photosensitive switch of the electronic system 1 that needs to be eliminated in order to authorize operation. Thus, the electronic system 1 is such that placing it in the reader/transmitter guarantees illumination of the photosensitive switch(es) needing to be illuminated in order to authorize operation. Such an arrangement advantageously makes it possible to authorize operation of the electronic system 1, including in the absence of ambient light, such as at night.

According to another advantageous aspect that may be used as an alternative or in addition, such a reader/transmitter may include at least one masking means associated with each photosensitive switch of the electronic system 1 that needs to be masked in order to authorize operation. Thus, the electronic system 1 is such that placing it in the reader/transmitter guarantees masking of the photosensitive switch (es) needing to be masked in order to authorize operation. Such an arrangement advantageously makes it possible to authorize operation of the electronic system 1 without requiring the use of masking means or of a finger 14.

Depending on the positions and the types of the switches present on the electronic system 1, a reader/transmitter advantageously includes complementary illumination and masking, so that merely being inserted in the reader/transmitter puts said switches in their configuration for authorizing operation.

The invention claimed is:

1. A device for providing protection against non-authorized use of an electronic system including an antenna, the device comprising:
    a first switch suitable for inhibiting the operation of the electronic system, wherein the first switch is photosensitive; and
    at least one second switch suitable for inhibiting the operation of the electronic systems, wherein the at least one second switch is photosensitive and wherein the at least one second switch operates with logic that is the inverse, relative to lighting, of the logic of the first switch.

2. The device according to claim 1, wherein the first switch is open when the first switch is illuminated.

3. The device according to claim 1, wherein the first switch is open when the first switch is not illuminated.

4. The device according to claim 1, wherein the first switch includes a photosensitive element that is of a size that is small enough to enable the photosensitive element to be covered by masking means having substantially the size of a finger.

5. The device according to claim 1, wherein the at least one second switch is suitable for inhibiting the operation of the electronic system when the at least one second switch is not illuminated.

6. The device according to claim 1, wherein the at least one second switch is suitable for inhibiting the operation of the electronic system when the at least one second switch is illuminated.

7. The device according to claim 1, wherein the at least one second switch includes a photosensitive element that is of a size that is small enough to enable the photosensitive element to be covered by masking means having substantially the size of a finger.

8. The device according to claim 1, wherein the antenna comprises at least two turns, and wherein the at least one second switch is arranged as a short-circuit between the at least two turns of the antenna.

9. The device according to claim 1, wherein the at least one second switch is arranged in series in a turn of the antenna.

10. The device according to claim 1, wherein the first switch includes a sensitive element that comprises an organic photoconductive material and/or the at least one second switch includes a sensitive element that comprises an organic photoconductive material.

11. The device according to claim 1, wherein the first switch includes a sensitive element that is covered in a translucent window and/or the at least one second switch includes a sensitive element that is covered in a translucent window.

12. An electronic system including an antenna wherein the system includes a device for providing protection according to claim 1.

13. An electronic system according to claim 12, wherein the electronic system is a microcircuit card.

14. A reader/transmitter of type suitable for communicating with an electronic system according to claim 12, including at least one illumination means and/or at least one masking means suitable for co-operating with the device for providing protection.

15. A method for manufacturing a device according to claim 1, wherein the method comprises:
    making a support including the antenna;
    depositing an organic photoconductive material in contact with the antenna; and
    covering the organic photoconductive material with at least one protection layer including a translucent window that is at least in register with the organic photoconductive material.

16. The device according to claim 1, wherein the antenna comprises at least two turns, and wherein the first switch is arranged as a short circuit between the at least two turns of the antenna.

* * * * *